United States Patent
McCarthy et al.

(10) Patent No.: US 8,255,709 B2
(45) Date of Patent: Aug. 28, 2012

(54) POWER BUDGETING FOR A GROUP OF COMPUTER SYSTEMS USING UTILIZATION FEEDBACK FOR MANAGEABLE COMPONENTS

(75) Inventors: Clifford A. McCarthy, Plano, TX (US); Zhikui Wang, Fremont, CA (US); Troy Miller, Plano, TX (US); Tom Turicchi, Dallas, TX (US); Parthasarathy Ranganathan, Fremont, CA (US); Xiaoyun Zhu, Cupertino, CA (US); Vanish Talwar, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 779 days.

(21) Appl. No.: 12/366,939

(22) Filed: Feb. 6, 2009

(65) Prior Publication Data
US 2010/0205469 A1 Aug. 12, 2010

(51) Int. Cl.
*G06F 1/26* (2006.01)
(52) U.S. Cl. .............................. 713/300; 700/30; 700/42
(58) Field of Classification Search .................. 713/300, 713/320; 700/30, 42
See application file for complete search history.

(56) References Cited

U.S. PATENT DOCUMENTS

| | | | |
|---|---|---|---|
| 6,775,997 B2 | 8/2004 | Bash et al. | |
| 6,795,928 B2 | 9/2004 | Bradley et al. | |
| 6,904,534 B2 | 6/2005 | Koenen | |
| 7,043,647 B2 | 5/2006 | Hansen et al. | |
| 7,155,623 B2 | 12/2006 | Lefurgy et al. | |
| 7,861,102 B1 * | 12/2010 | Ranganathan et al. | 713/300 |
| 8,001,402 B2 * | 8/2011 | Kashyap et al. | 713/320 |
| 2006/0282685 A1 | 12/2006 | Bahali et al. | |
| 2007/0067657 A1 | 3/2007 | Ranganathan et al. | |

OTHER PUBLICATIONS

Raghavendra et al., "No power struggles: Coordinated multi-level power management for the data center," In ASPLOS XIII, Mar. 1-5, 2008.*
"HP Power Regulator for ProLiant Overview", HP.com-ProLiant Management, http://h18004.www1.hp.com/products/servers/management/ilo/power..., Jan. 29, 2009.
"HP Power Regulator for ProLiant", HP.com-ProLiant Management, http://h18004.www1.hp.com/products/servers/management/ilo/sup_s..., Jan. 29, 2009.
"Dynamic Power Capping Frequently Asked Questions", HP.com-Dynamic Power Capping, http://h18004.www1.hp.com/products/servers/management/dynamic..., Jan. 29, 2009.
"HP ProLiant c-Class Server Blades", technology brief, 2nd edition, Jan. 29, 2009.

* cited by examiner

*Primary Examiner* — Albert Wang

(57) ABSTRACT

Power consumption of a group of computer systems is managed based on a maximum power consumption for the group. A power budget is determined from the power consumption of each computer system and the maximum power consumption for the group. The power budget identifies a power cap for each computer system in the group. The power caps in the power budget are distributed to the computer systems in the group.

21 Claims, 5 Drawing Sheets

POWER BUDGETING FOR A GROUP OF COMPUTER SYSTEMS USING UTILIZATION FEEDBACK FOR MANAGEABLE COMPONENTS

BACKGROUND

Power and cooling are emerging to be key challenges in data center environments. A recent International Data Corporation (IDC) report estimated the worldwide spending on enterprise power and cooling to be more than $30 billion and likely to even surpass spending on new server hardware in the near future. Furthermore, many data centers are reporting millions of dollars of spending on electricity costs for annual usage.

While there has been a lot of progress made on this problem, one of the key challenges is that the conventional solutions only address individual aspects of the problem in isolation. For example, one solution may try to reduce power consumption at the processor level, for example, through voltage and frequency scaling. Another solution implemented at the software level for virtual machines (VMs) is to consolidate workloads and power down unused hosts to reduce power consumption when demand is low. These solutions are not coordinated. In the absence of coordination between these various solutions, they are likely to interfere with one another in unpredictable and potentially dangerous ways, and without coordination, the solutions operate less efficiently.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to an embodiment, a control system is used to control the power in a group of computer systems. The computer systems may include servers and the computer systems are generally referred to as servers herein. However, the group of computer systems may include other types of computer systems. The control system architecture operates at the group level and at the server level to budget and manage power consumption of the group and each server within a power budget. The power budget identifies a maximum power consumption for each server in the group based on a power cap for the group and power demand of each server. The power budget is dynamic and can be varied as server power demands vary. At the group level, the control system uses a group capper to maintain the power consumption of the group within a specified level. At the server level, the control system uses a server capper and an efficiency controller to maintain the power consumption of the server within a specified level. The dual-layer power management with group and server layers working in conjunction increases efficiency while maintaining the power consumption of the servers within the power budget.

Figure 1:
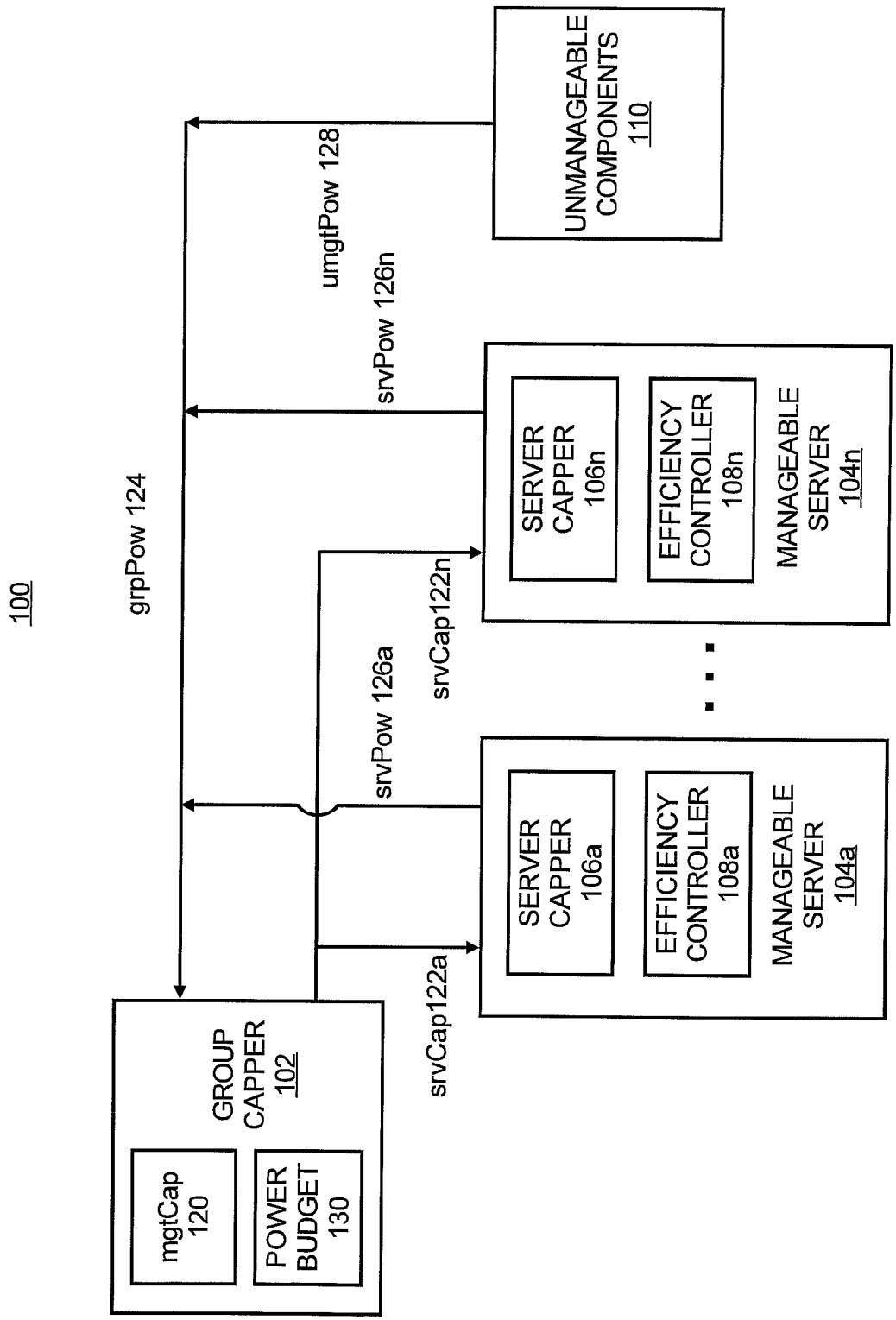
FIG. 1 illustrates a control system architecture for group-level power management, according to an embodiment.

FIG. 1 illustrates a group power consumption control system architecture 100, according to an embodiment. The system 100 comprises a group capper 102 connected to a group of computer systems, represented by manageable servers 104a-n and unmanageable components 110. The group capper 102 imposes a power cap (mgtCap 120) on the group and a power cap (srvCap 122a-n) on each manageable server 104. A group may or may not have the unmanageable components 110. The unmanageable components 110 may include computer systems that do not utilize the group capper to control power consumption therein, or other components, such as fans, etc. Their power consumption may be taken into consideration when determining a power budget for the group but their individual power consumptions are not controlled by the group capper 102.

The mgtCap 120 is the total power consumption allowed for the group. It may be based on the total power consumption that can be handled by a circuit without causing a circuit breaker for the circuit to trip. Multiple computer system groups may be connected to the circuit, so the mgtCap 120 can be based on power consumption for all the groups on the circuit. The mgtCap 120 may be determined by a system administrator or through a computerized technique and provided to the group capper 102.

The group capper 102 maintains the overall power of the group, including the unmanageable components 110 and the manageable servers 104, within the mgtCap 120 by a feedback mechanism. The feedback is the power consumed by each of the manageable servers 104, shown as srvPow 126a-n. The feedback also includes the power consumed by the unmanageable components 110, shown as umgtPow 128. These power consumptions may be measured by each individual server or system and sent to the group capper 102. The group capper 102 determines a power budget 130 from the power consumptions srvPow 126a-n and umgtPow 128, as well as the mgtCap 120. Each manageable server 104a-n is assigned a portion of the mgtCap 120 based on its power consumption, srvPow 126a-n. The assigned portions are the srvCap 122a-n and are the values that make up the power budget 130. The power budget 130 varies as power consumptions srvPow 126a-n of the manageable servers 104a-n varies. A server with a higher consumption, for example, may be assigned a greater portion of the mgtCap 120.

As described above, the srvCap 122a-n is reactive in the sense that they are varied based on past power consumption measurements. Other metrics may also be considered, such as the history of power consumption of each of the manageable servers 104a-n to make the power budget 130 more predictive. For example, if it is known that manageable server 104a runs a heavier workload at the same time of day, then during that time period, the manageable server 104a is given a larger server cap. It should be noted that the power consumption umgtPow 128 is also considered when assigning portions of the mgtCap 120 to the manageable servers 104a-n. For example, the umgtPow 128 is first subtracted from the mgt- Cap 120, and the remaining portion of the mgtCap 120 is divided among the manageable servers 104*a-n*.

Figure 2:
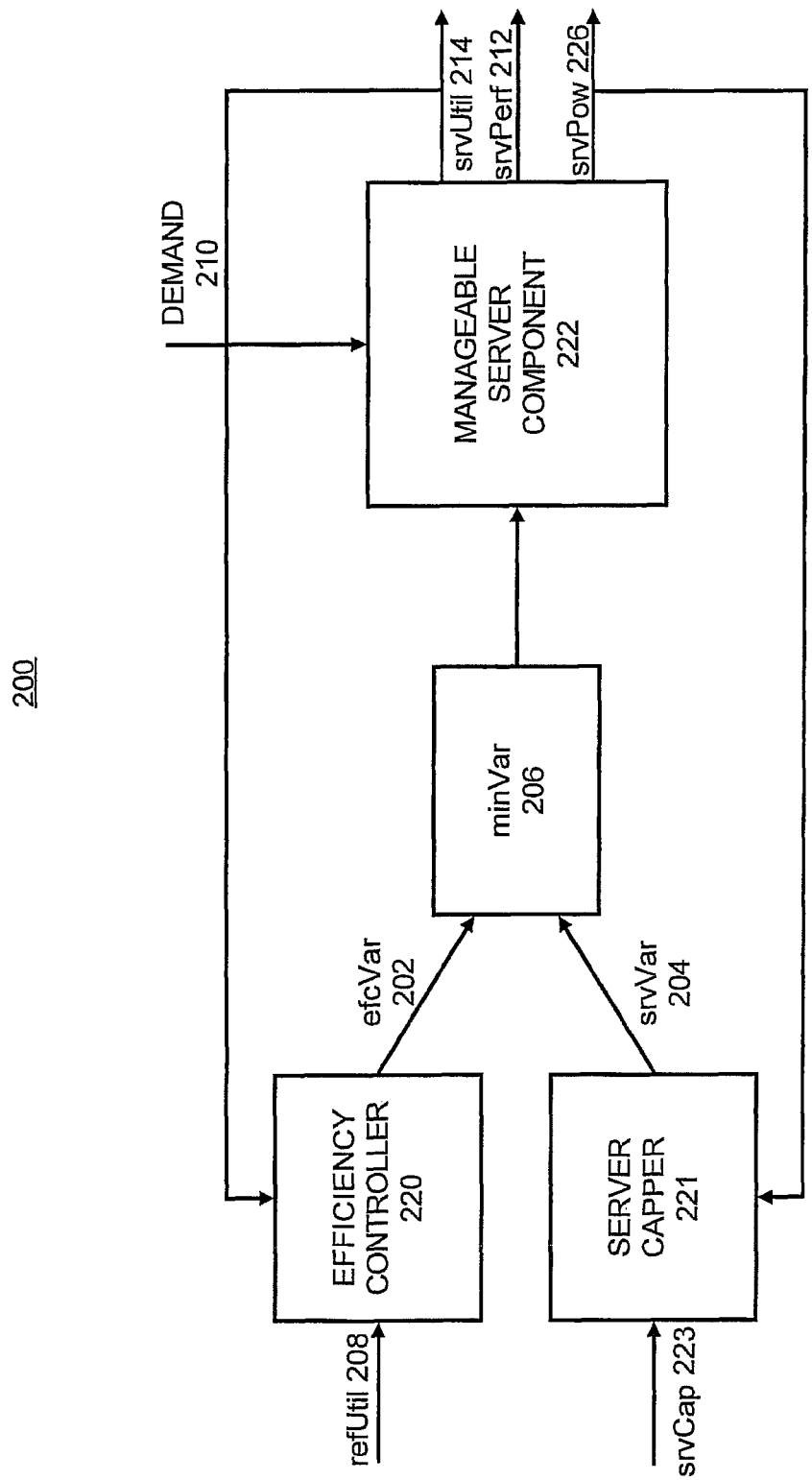
FIG. 2 illustrates a control system architecture for server-level power management, according to an embodiment.

FIG. 1 shows server cappers 106*a-n* and efficiency controllers 108*a-n* with the manageable servers 104*a-n*. The server cappers 106*a-n* and efficiency controllers 108*a-n* control power management at the server layer as described in further detail with respect to FIG. 2. FIG. 2 illustrates a power management layer in a manageable server 200, according to an embodiment. The manageable server 200 shown in FIG. 2 may be any of the manageable servers 104*a-n* shown in FIG. 1.

FIG. 2 shows the manageable server 200 including efficiency controller 220 and server capper 221, which correspond to the efficiency controllers and server cappers shown in FIG. 1. The efficiency controller 220 and server capper 221 are both controllers used in determining the output of the manageable server 200. The demand 210 represents the workload of the manageable server 200. A variable output (efcVar 202) of the efficiency controller 220 is used along with a variable output (srvVar 204) of the server capper 221 to set the manageable server 200 at a level of power consumption that is most efficient while remaining within the server power cap (srvCap 223). srvCap 223 is determined from the power budget as described with respect to FIG. 1.

When determining a desired level of power consumption the efficiency controller 220 receives a metric srvUtil 214 from the manageable server component 222 indicating the level of utilization of the manageable server component 222. The manageable server component 222 is a component of the server 200 that can be controlled to vary the power consumption of the server. In one example, the manageable server component 222 is a CPU that can be put into different power states, which increases or decreases power consumption of the server 200.

The efficiency controller 220 uses the metric srvUtil 214 and a reference utilization (refUtil 208) to determine a variable (efcVar 202) that can be used to tune the manageable server component 222 to control the power consumption of the server 200.

The srvUtil 214 is the current utilization of the manageable server component 222. The utilization is the capacity consumption as a percentage of the capacity available. In the example where the manageable server component 222 is a CPU, an example of srvUtil 214 is 35% utilization.

The refUtil 208 is a desired utilization of the manageable server component 222. The refUtil 208 may be set to a value that optimizes power management efficiency of the management server 200 without compromising the workload performance. The refUtil 208 may be based on a historical analysis of utilization of the manageable server component 222 and performance of the workload. Lower refUtil 208 means that, for a given workload demand, more capacity is expected to accommodate the workload. This results in better performance of the workload hosted on the manageable server in terms of variables such as response time.

The efcVar 202 is a variable used to adapt the power consumption of the manageable server component 222 to the demand of the workload. In one example, the efcVar 202 is the frequency of the CPU which can be scaled up or down when the demand of the workload increases or decreases. This results in higher or lower power consumption. The different frequencies and/or voltages are referred to as P-states. Instead of P-states, Q-states may be used. Q-state is an extension of P-state which forces the CPU idle some percentage of the time. Q-state gives the controller a greater degree of control. For example, once the CPU is in a lower power state, a further limitation on the power consumption may be achieved by forcing the CPU idle some percent of the time because idle operation consumes less power.

For example, assume the refUtil 208 is 80% of the capacity available, and the srvUtil 214 is 35% of the capacity available. Also, assume the current P-state of the CPU is 2 GHz. The refUtil 208 represents the boundary at which the CPU changes the level at which it consumes power, when the demand of the workload changes. When the demand increases and such that srvUtil 214 gets above the refUtil 208, the CPU may be toggled into a higher power state, and when the demand decreases and such that srvUtil 214 gets below the refUtil 208, the CPU may be toggled into a lower power state. Since srvUtil 214 is well below the refUtil 208, the CPU may be toggled into a lower power state, such as a 1 GHz frequency. This may result in increasing srvUtil 214 to 70% CPU capacity, which is still below the refUtil 208, and can result in the CPU using less power. In another example, the power state may be increased, and can result in a percentage of the capacity available increasing but remaining below the refUtil 208. This higher power state may allow the CPU to perform workload functions faster.

The server capper 221 receives the server power cap srvCap 122 from the power budget for the group from the group capper 102. The server capper 221 compares the srvCap 122 and a metric indicating server power consumption (srvPow 226) received from the manageable server component 222 in determining a variable (srvVar 204) that may be used to tune the manageable server component 222 to a power state. The srvCap 223 is a hard cap and should not be exceeded. The server capper 221 receives the measured power consumption of the server 200, shown as srvPow 226. If srvPow 226 is close to or exceeds srvCap 223, the server capper 221 reduces the power state of the manageable server component 222. For example, the server capper 221 reduces the frequency of the CPU, so the CPU consumes less power. In this example, the frequency of the CPU is the srvVar 204.

MinVar 206 selects the lesser of srvVar 204 and efcVar 202 for implementation by the manageable server component 222. It is assumed the lesser of srvVar 204 and efcVar 202 will result in lower power consumption. For example, if srvVar 204 is 1.5 GHz and efcVar 202 is 2.5 GHz, MinVar 206 selects 1.5 GHz frequency for the CPU. As a result of using MinVar 206, the srvCap 223 is not to be exceeded.

Note that the group capper 102, by way of illustration, may operate on a multiple second timescale while the server capper 221 and efficiency controller 220 operate at a faster time scales, for example many times per second. This gives electrical circuit protection. The group capper 102 can run slower and so if the system suddenly becomes busy it may be constrained for seconds but circuit compliance is maintained by virtue of the fact that the manageable servers are staying in compliance with their caps and the power budget 130 caps stay in compliance with the overall collective goal.

Many of the examples described above assume a smooth relationship between a variable, such as CPU frequency, and power consumption (e.g., as CPU frequency increases, power consumption increases at a similar rate). When the relationship is sharply nonlinear, it is difficult for the efficiency controller 220 and the server capper 221 (which may use PID (proportional-integral-derivative) controllers) to determine the correct value of the variable to use to manage power consumption.

To deal with the nonlinearity from variable to power consumption, a piecewise linear transformation from the PID controller output to the variable is introduced. The PID controller output is no longer mapped evenly to the variable. After this transformation the relationship between the PID controller output and the peak power consumption is linearized. A function can be used so that the output of the PID controller is bounded within a defined scale, and then mapped to the variable using nonlinear mapping.

Figure 3:
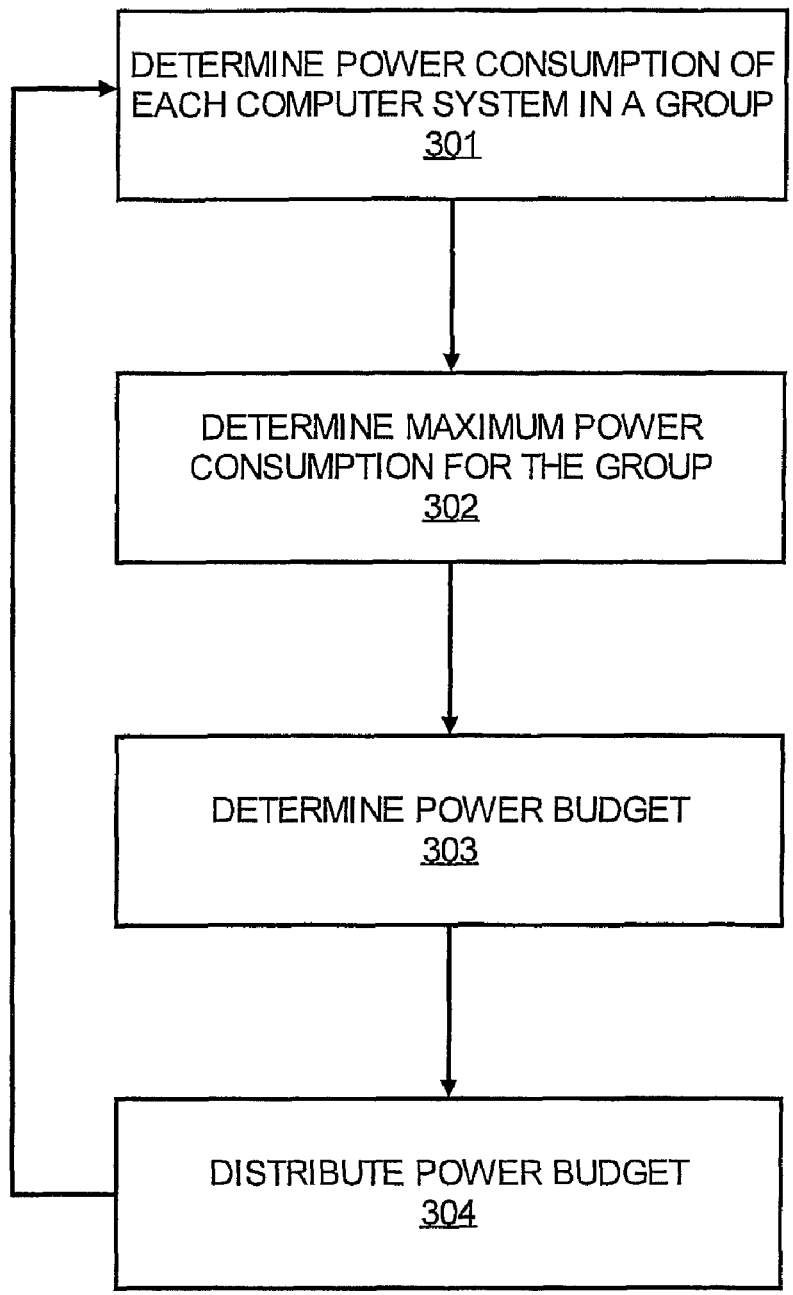
FIG. 3 illustrates a method for group-level power management, according to an embodiment.

FIG. 3 illustrates a method 300 for managing power consumption of a group of computer systems, according to an embodiment. The method 300 and other methods described below are described with respect to FIGS. 1 and 2 by way of example and not limitation, and may be used in other systems.

At step 301, the power consumption of each computer system in the group is determined. For example, the group capper 102 in FIG. 1 measures the power consumed by each of the manageable servers 104.

At step 302, the maximum power consumption for the group is determined. This is the maximum power consumption allowed for the group and is a group cap (e.g., the mgtCap 120 shown in FIG. 1). For example, at step 302, the mgtCap 120 is received at the group capper 102.

At step 303, a power budget is determined based on the power consumption of each computer system in the group and the maximum power consumption for the group. For example, if the mgtCap 120 is 2500 Watts, a portion of the 2500 Watts is assigned to each server based on their workload demand, measured power consumption, workload and power histories, etc. The group capper 102 determines which servers are busy and which are less busy and allocates power caps accordingly. The power budget includes the srvCap, which is the assigned portion of the mgtCap 120 for each manageable server. The example described above allocates the entire 2500 Watts of the mgtCap to each manageable computer system in the group. However, in another embodiment, less than the entire mgtCap may be allocated. For example, 90% of the mgtCap may be allocated to the group, so if a computer system in the group exceeds its srvCap, the mgtCap will not be exceeded.

The power budget may be varied over time using feedback. In one embodiment a PID controller is used to vary the power budget according to previous consumption. The feedback may utilize a linearization process so that the relationship between controller output and power consumption becomes linear. The power consumption of the unmanageable components is also used in determining the mgtCap.

At step 304, the power budget is distributed to each manageable server. This includes sending the corresponding srvCap to each manageable server. This method is repeated periodically so the power budget can be dynamically determined based on varying demands of the manageable servers.

Figure 4:
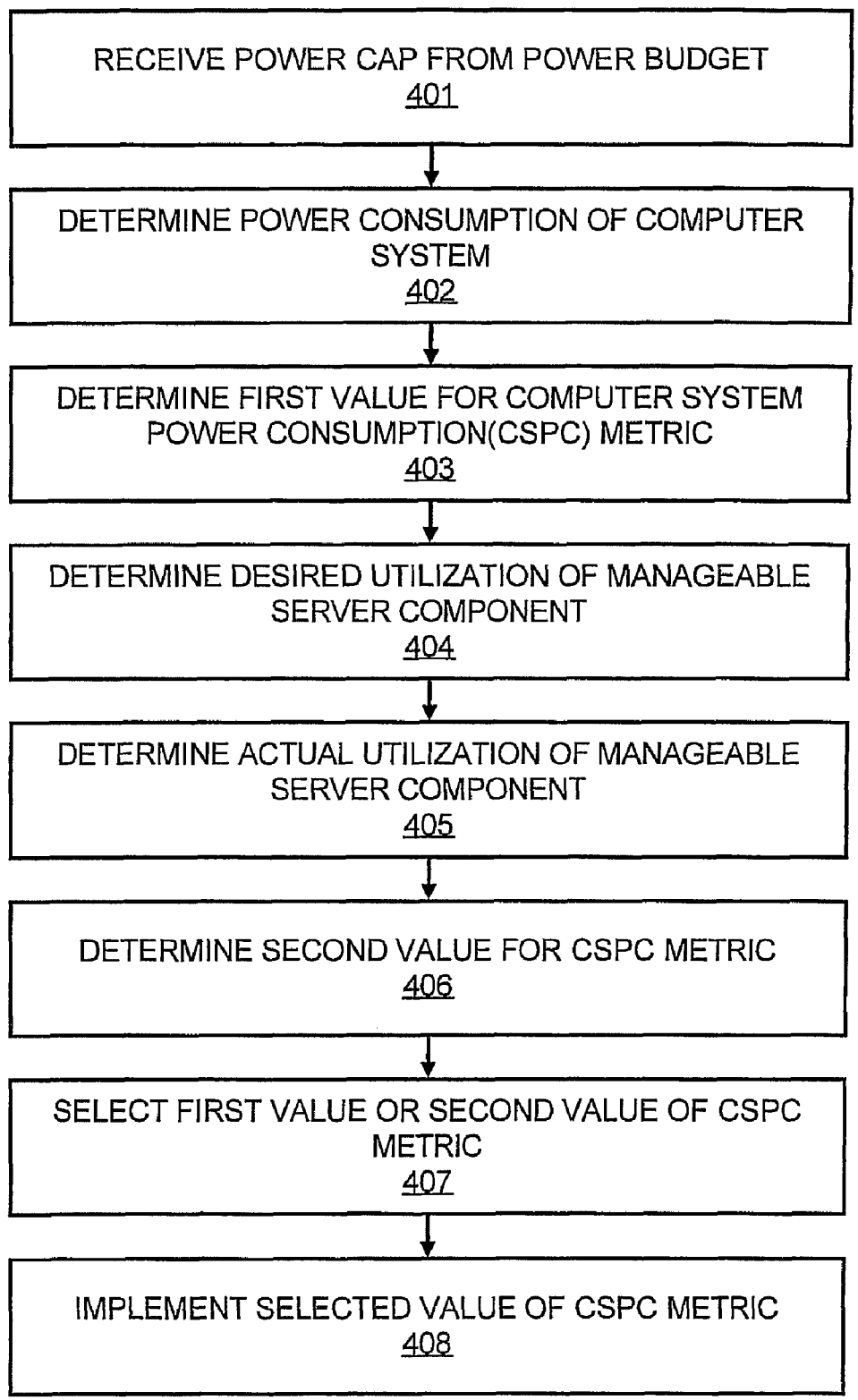
FIG. 4 illustrates a method for server-level power management, according to an embodiment.

FIG. 4 illustrates a method 400, according to an embodiment. The method 400 is described with respect to FIGS. 1 and 2 by way of example and not limitation. The steps of the method 400 use the power budget determined in the method 300. Also, one or more of the steps of the method 400 may be performed in different orders than shown or substantially simultaneously. Also, the method 400 describes the second layer of power management performed at the computer system level. The method 400 is described with respect to one computer system in the group, but the steps are performed by all the managed computer systems in the group.

At step 401, the power cap from the power budget is received at the computer system. For example, a manageable server shown in FIGS. 1 and 2 receives a power cap, srvCap, from the power budget.

At step 402, the power consumption of the computer system is determined. As shown in FIGS. 1 and 2, srvPow is the measured power consumption of the manageable server. A conventional sensor may be used to measure power consumption.

At step 403, a first value for a computer system power consumption (CSPC) metric is determined based on a comparison of the power cap and the power consumption of the computer system. The CSPC metric is a metric that can be changed to vary the power consumption of the computer system. For example, if the CSPC metric is P-state for a CPU, the value for the metric is the voltage and frequency for a particular P-state. For example, P0=1.35V/2.6 GHz, P1=1.3V/2.4 GHz, etc. The particular voltage and frequency for a particular P-state is the value for the CSPC metric of P-state. The value is referred to as first value to distinguish from other values determined for the CSPC metric. The first value is shown as efcVar 202 in FIG. 2.

In this example, the P-state may be increased based on a comparison of the power cap to the power consumption. For a given demand, the server at P0 consumes more power than at P1. For example, if the power consumption is approaching the power cap, the P-state is reduced (for example P0 to P1) to lower power consumption of the computer system. If the power consumption is well below the power cap, the P-state may be increased to improve performance of the CPU and improve performance metrics for applications run by the CPU.

At step 404, a desired utilization of a manageable server component in the computer system is determined. The desired utilization is shown as refUtil 208 in FIG. 2. The manageable server component is a component of a computer system that can be controlled to change the power consumption of the computer system. In the example above, the manageable server component is a CPU.

At step 405, an actual utilization of the manageable server component is determined. This is shown as srvUtil 214 in FIG. 2. Conventional sensors or hardware management tools may be used to determine power consumption and utilization.

At step 406, a second value for the CSPC metric is determined based on a comparison of the desired utilization and the actual utilization. For example, a P-state is selected to achieve the desired utilization. This may include selecting a lower P-state for the second value if the actual utilization needs to be increased to achieve the desired utilization, or selecting a higher P-state for the second value if the actual utilization needs to be increased to achieve the desired utilization. The second value is shown as srvVar 204 in FIG. 2.

At step 407, the first value or the second value of the CSPC is selected so as not to exceed the power cap for the computer system. For example, if the second value indicates to move to a higher P-state to achieve the desired utilization, and the first value indicates to maintain the P-state so as not to exceed the power cap, the first value is selected as the P-state.

At step 408, the selected value of the CSPC metric is implemented for the manageable server component to manage the computer system's power consumption. This may include changing the P-state if needed or changing another metric if the CSPC metric is something other than P-state.

Figure 5:
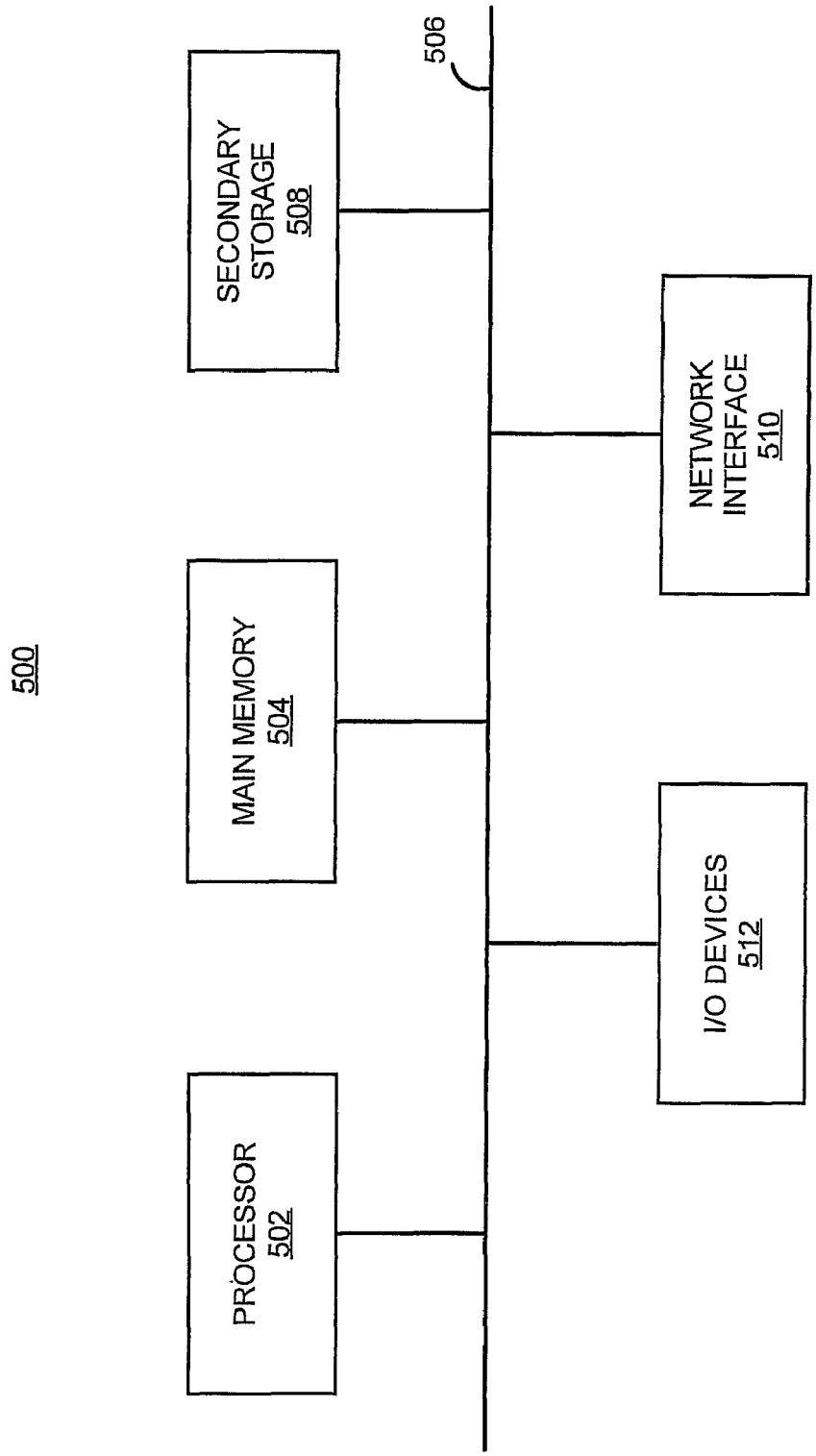
FIG. 5 illustrates a computer system that may be used as a platform for the systems and methods of the embodiments.

FIG. 5 illustrates a block diagram of a general purpose computer system 500 that is operable to be used to execute one or more computer programs implementing the embodiments described herein, including steps described herein. The computer system 500 may be used as a platform for the control system architecture. It will be apparent to one of ordinary skill in the art that a more sophisticated computer system is operable to be used. Furthermore, components can be added or removed from the computer system 500 to provide the desired functionality.

The computer system 500 includes one or more processors, such as processor 502, providing an execution platform for executing software. Commands and data from the processor 502 are communicated over a communication bus 506. The computer system 500 also includes computer readable storage mediums including a main memory 504, such as a Random Access Memory (RAM), where software is resident during runtime, and a secondary storage 508. The secondary storage 508 includes, for example, a hard disk drive and/or a removable storage drive representing a floppy diskette drive, a magnetic tape drive, a compact disk drive, etc., or a nonvolatile memory where a copy of the software is stored. In one example, the secondary storage 508 also includes ROM (read only memory), EPROM (erasable, programmable ROM), EEPROM (electrically erasable, programmable ROM). The computer system 500 includes one or more input/output (I/O) devices 512, such as a display, keyboard, a mouse, a stylus, and the like. A network interface 510, wired and/or wireless, is provided for communicating with other computer systems.

One or more of the steps of the methods described herein and other steps described herein and one or more of the components of the systems described herein may be implemented as computer code stored on a computer readable medium, such as the memory and/or secondary storage, and executed on a computer system, for example, by a processor, application-specific integrated circuit (ASIC), or other controller. The code may exist as software program(s) comprised of program instructions in source code, object code, executable code or other formats. Examples of computer readable medium include conventional computer system RAM (random access memory), ROM (read only memory), EPROM (erasable, programmable ROM), EEPROM (electrically erasable, programmable ROM), hard drives, and flash memory.

While the embodiments have been described with reference to examples, those skilled in the art will be able to make various modifications to the described embodiments without departing from the scope of the claimed embodiments.

What is claimed is:

1. A non-transitory computer readable medium including code that when executed by a computer system performs a method for managing power consumption of a group of computer systems, the code causing the computer system to:
   determine a power consumption of each computer system in a group of computer systems;
   determine a maximum power consumption for the group;
   determine a power budget based on the power consumption of each computer system and maximum power consumption for the group, wherein the power budget identifies a power cap for each computer system in the group;
   distribute the power caps in the power budget to the computer systems in the group; and
   at each computer system in the group, the code is to:
     determine, a desired utilization of a manageable server component in the computer system;
     measure an actual utilization of the manageable server component;
     compare the desired utilization to the actual utilization;
     determine a value for a computer system power consumption metric based on the comparison of the desired utilization and the actual utilization, wherein a relationship between the computer system power consumption metric and the power consumption of the computer system is nonlinear and the code is to perform a piecewise linear transformation to linearize the value; and
     compare the value to the power cap for the computer system to achieve the desired utilization within the power cap.

2. The non-transitory computer readable medium of claim 1, wherein the code is to:
   measure, at each computer system in the group, the power consumption of the computer system;
   compare the power consumption to the power cap for the computer system provided in the power budget; and
   determine a first value for a computer system power consumption metric based on the comparison of the power cap and the power consumption.

3. The computer readable medium of claim 2, wherein the value is a second value and the code is to:
   select one of the first value and the second value for the manageable server component to control power consumption of the computer system based on the selected value.

4. The non-transitory computer readable medium of claim 3, wherein the code to select one of the first value and the second value further comprises code to:
   select one of the first value and the second value for the manageable server component to control power consumption of the computer system, wherein the computer system does not exceed its power cap.

5. The non-transitory computer readable medium of claim 3, wherein the code to perform the piecewise linear transformation comprises code to:
   determine a relationship curve of power consumption versus the computer system power consumption metric;
   determine a curve of a controller output versus the computer system power consumption metric to represent a linear relationship between the power consumption and the controller output; and
   use the linearizing curve to select the first value or the second value.

6. The non-transitory computer readable medium of claim 3, wherein the computer system power consumption metric is a power state of a central processing unit.

7. The non-transitory computer readable medium of claim 1, wherein the power budget is varied using a feedback based on power consumption of one or more unmanageable components in the group.

8. The non-transitory computer readable medium of claim 1, wherein the power budget is varied using a feedback based on power consumption of each computer system.

9. The non-transitory computer readable medium of claim 1, wherein the maximum power consumption for the group is based on power consumption of all groups connected to a circuit and a maximum allowed power consumption for the circuit.

10. A system managing power consumption of a group of computer systems, the system comprising:
   a group capper computer system including:
     an interface to receive power consumption measurements from the computer systems in the group;
     data storage to store a maximum power consumption for the group and the power consumption measurements; and
     a processor to determine a power budget based on the power consumption measurements of the computer systems in the group and the maximum power consumption for the group, wherein the power budget identifies a power cap for each computer system in the group;
   wherein each computer system in the group includes a processor to:
     determine a desired utilization of a manageable server component in the computer system;
     measure an actual utilization of the manageable server component;
     compare the desired utilization to the actual utilization;

determine a value for a computer system power consumption metric based on the comparison of the desired utilization and the actual utilization;

perform a piecewise linear transformation to linearize the value when a relationship between the computer system power consumption metric and a power consumption of the computer system is nonlinear; and compare the value to the power cap for the computer system to achieve the desired utilization within the power cap.

11. The system of claim 10, wherein a total of the power caps in the power budget does not exceed the maximum power consumption for the group.

12. The system of claim 10, wherein the power cap for each computer system is a portion of the maximum power consumption determined from the power consumption for the computer system.

13. The computer system of claim 10, wherein the power budget is varied using a feedback based on power consumption of one or more unmanageable components in the group.

14. The system of claim 10, wherein the system further comprises:

a controller at each computer system, the controller to:
determine a relationship curve of power consumption versus the computer system power consumption metric;
determine a linearizing curve of a controller output versus the computer system power consumption metric to represent a linear relationship between the power consumption and the controller output; and
use the linearizing curve to select the first or the second value.

15. The system of claim 10, wherein the power budget is varied using a feedback based on power consumption of one or more unmanageable components in the group.

16. The system of claim 10, wherein the power budget is varied over time based on historical power consumption.

17. A computer system configured to control power consumption of a manageable component, the computer system comprising:

a capper to determine a first value for a computer system power consumption metric based on a comparison of a power cap for the computer system and a power consumption of the computer system; and an efficiency controller to determine a second value for the computer system power consumption metric based on a comparison of a desired utilization of the manageable component and an actual utilization of the manageable component, wherein one of the first value and the second value is selected for the manageable component to control power consumption of the computer system based on the selected value; and wherein at least one of the efficiency controller and the capper includes a proportional integral derivative controller.

18. The computer system of claim 17, wherein one of the first value and the second value is selected so as not to exceed the power cap.

19. The computer system of claim 17, wherein the proportional integral derivative controller is to:
determine a relationship curve of power consumption versus the computer system power consumption metric, and
determine a curve of a controller output versus the computer system power consumption metric to represent a linear relationship between the power consumption and the controller output, and
use the linearizing curve to select the first value or the second value.

20. The computer system of claim 17, wherein the power budget is varied over time based on historical power consumption.

21. A system managing power consumption of a group of computer systems, the system comprising:

a group capper computer system including:
an interface receiving power consumption measurements from the computer systems in the group;
data storage storing a maximum power consumption for the group and the power consumption measurements; and
a processor determining a power budget based on the power consumption measurements of the computer systems in the group and the maximum power consumption for the group, wherein the power budget identifies a power cap for each computer system in the group and the power budget is varied using a feedback based on power consumption of one or more unmanageable components in the group;

wherein each computer system in the group includes a processor to:
determine a desired utilization of a manageable server component in the computer system;
measure an actual utilization of the manageable server component;
compare the desired utilization to the actual utilization;
determine a value for a computer system power consumption metric based on the comparison of the desired utilization and the actual utilization; and
compare the value to the power cap for the computer system to achieve the desired utilization within the power cap.

* * * * *

UNITED STATES PATENT AND TRADEMARK OFFICE
CERTIFICATE OF CORRECTION

PATENT NO. : 8,255,709 B2  
APPLICATION NO. : 12/366939  
DATED : August 28, 2012  
INVENTOR(S) : Clifford A. McCarthy et al.

Page 1 of 1

It is certified that error appears in the above-identified patent and that said Letters Patent is hereby corrected as shown below:

In the Claims:

In column 7, line 44, in Claim 1, after "and" insert -- a --.

Signed and Sealed this  
Twenty-first Day of May, 2013

Teresa Stanek Rea  
*Acting Director of the United States Patent and Trademark Office*